US012613733B2

(12) United States Patent
Zhu

(10) Patent No.: US 12,613,733 B2
(45) Date of Patent: Apr. 28, 2026

(54) METHOD AND DEVICE FOR PROCESSING SERVICE USING REQUEST, AND COMPUTER READABLE STORAGE MEDIUM

(71) Applicant: Apollo Intelligent Driving Technology (Beijing) Co., Ltd., Beijing (CN)

(72) Inventor: Bo Zhu, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 850 days.

(21) Appl. No.: 17/947,620

(22) Filed: Sep. 19, 2022

(65) Prior Publication Data
US 2023/0014025 A1 Jan. 19, 2023

(30) Foreign Application Priority Data
Oct. 26, 2021 (CN) .......................... 202111247601.9

(51) Int. Cl.
*G06F 9/46* (2006.01)
*G06F 9/48* (2006.01)
*G01C 21/26* (2006.01)

(52) U.S. Cl.
CPC ........... *G06F 9/4831* (2013.01); *G01C 21/26* (2013.01)

(58) Field of Classification Search
CPC .............................. G06F 9/4831; G01C 21/26
See application file for complete search history.

(56) References Cited

U.S. PATENT DOCUMENTS

| | | | | |
|---|---|---|---|---|
| 10,447,483 | B1 * | 10/2019 | Su | H04L 9/3226 |
| 10,901,415 | B1 * | 1/2021 | Herbach | G06Q 10/02 |
| 2007/0185753 | A1 | 8/2007 | Shimmoto | |
| 2020/0001727 | A1 * | 1/2020 | Li | B60L 50/62 |
| 2021/0004352 | A1 * | 1/2021 | Rawal | G06F 16/1756 |
| 2021/0229699 | A1 * | 7/2021 | Chen | G07C 5/0841 |

(Continued)

FOREIGN PATENT DOCUMENTS

| | | |
|---|---|---|
| CN | 102114818 A | 7/2011 |
| CN | 104486401 A | 4/2015 |
| CN | 107277085 A | 10/2017 |

(Continued)

OTHER PUBLICATIONS

Liu, Feng, et al. "Application of Design Patterns and Component Technology to Business Logic Layer." Jisuanji Xitong Yingyong—Computer Systems and Applications 20.10 (2011): 154-159.

*Primary Examiner* — Tammy E Lee
(74) *Attorney, Agent, or Firm* — Knobbe, Martens, Olson & Bear, LLP

(57) ABSTRACT
A method and apparatus for processing a service using a request in a computer readable storage medium. An embodiment of the method comprises: acquiring a service using a request for a vehicle-mounted device; determining a to-be-processed request from unprocessed service using requests; determining, using a preset navigation status service layer, a service type to which the to-be-processed request belongs; and calling, using the navigation status service layer, a service module corresponding to the service type to process the to-be-processed request, the navigation status service layer recording corresponding relationships between different service types and different service modules.

20 Claims, 4 Drawing Sheets

(56)                    References Cited

U.S. PATENT DOCUMENTS

2023/0150540 A1*    5/2023    Kim  ................. B60W 30/0953
                                                        701/25

FOREIGN PATENT DOCUMENTS

| | | | |
|---|---|---|---|
| CN | 110298769 | A | 10/2019 |
| CN | 110309002 | A | 10/2019 |
| CN | 111064772 | A | 4/2020 |
| CN | 111221645 | A | 6/2020 |
| CN | 111949899 | A | 11/2020 |
| CN | 112184196 | A | 1/2021 |
| KR | 20170072852 | A | 6/2017 |

* cited by examiner

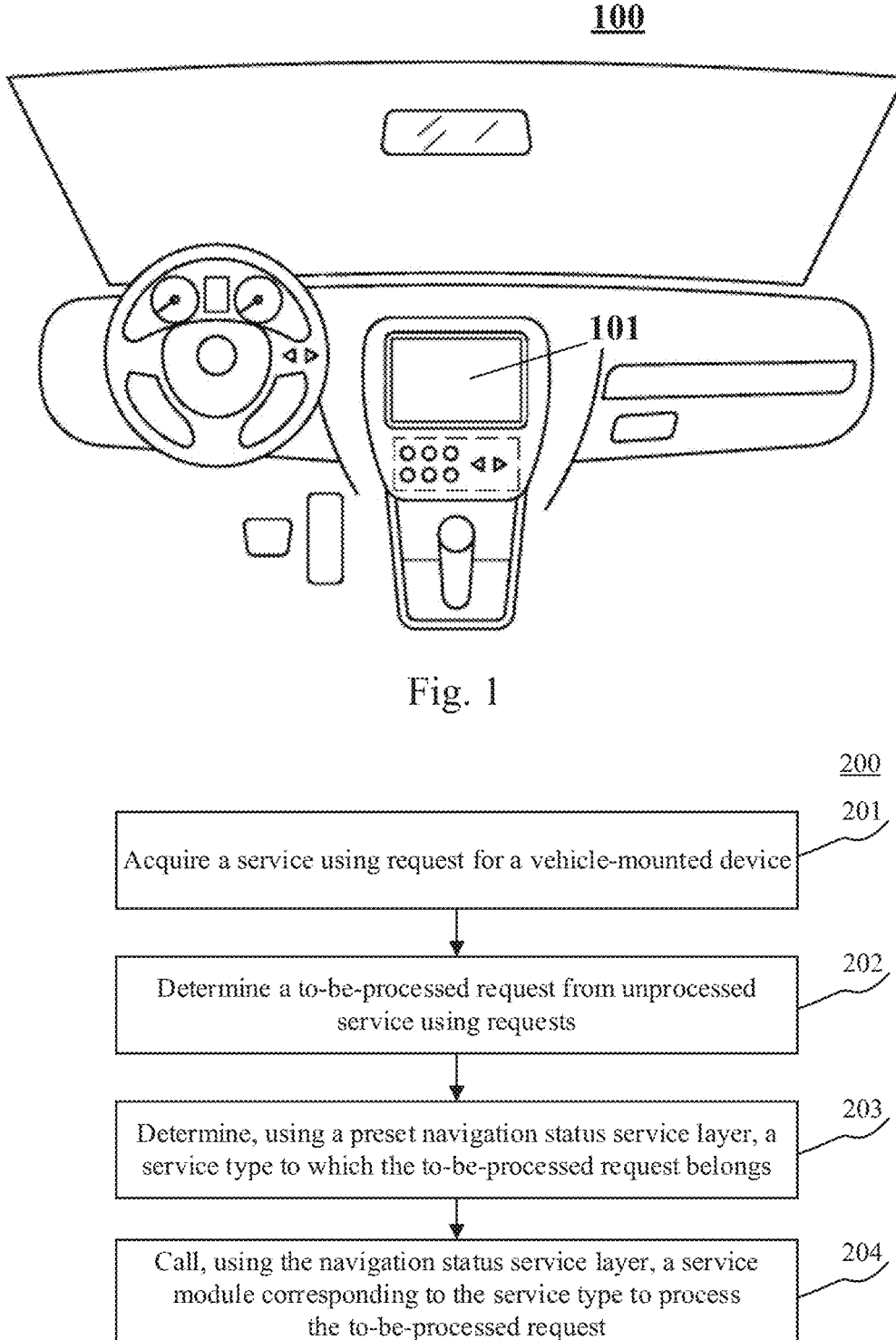

201
Acquire a service using request for a vehicle-mounted device

202
Determine a to-be-processed request from unprocessed service using requests

203
Determine, using a preset navigation status service layer, a service type to which the to-be-processed request belongs 204
Call, using the navigation status service layer, a service module corresponding to the service type to process the to-be-processed request

Fig. 2

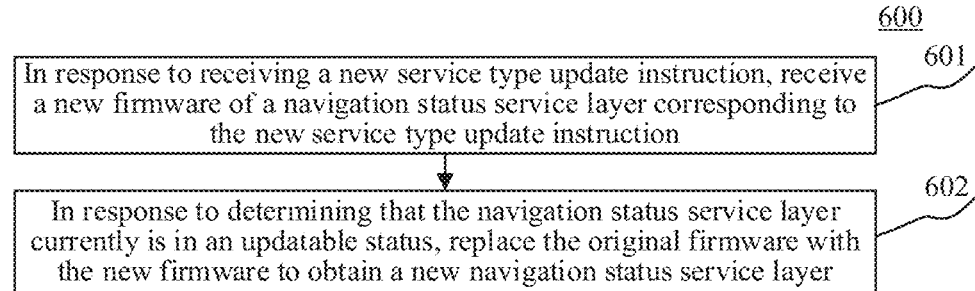

600

In response to receiving a new service type update instruction, receive a new firmware of a navigation status service layer corresponding to the new service type update instruction                601

In response to determining that the navigation status service layer currently is in an updatable status, replace the original firmware with the new firmware to obtain a new navigation status service layer                602

Apparatus for processing a service using request

Service using request acquiring unit                701

To-be-processed request determining unit                702

Service type determining unit                703

Service module calling and processing unit                704

Computing unit                801

ROM                802

RAM                803

804

805

I/O interface

Input unit                806

Output unit                807

Storage unit                808

Communication unit                809

Fig. 8

METHOD AND DEVICE FOR PROCESSING SERVICE USING REQUEST, AND COMPUTER READABLE STORAGE MEDIUM

CROSS-REFERENCE TO RELATED APPLICATIONS

This application claims priority to Chinese Patent Application No. 202111247601.9, filed with the China National Intellectual Property Administration (CNIPA) on Oct. 26, 2021, the content of which is incorporated herein by reference in its entirety.

TECHNICAL FIELD

The present disclosure relates to the field of data processing technology, particularly to the field of intelligent transportation technology such as intelligent vehicle-mounted device and navigation technologies, and more particularly to a method for processing a service using request, an electronic device, a computer readable storage medium.

BACKGROUND

With the continuous development of electronic informatization, intelligent hardware, intelligent driving, and other concepts, vehicle-mounted terminals (also called vehicle-mounted devices) are no longer limited to the initial single navigation service, and the requirements of users are increasing and becoming more and more diverse.

With the increase in the number of functions required to be added, the initial architecture design scheme cannot support the development of existing services, and there are more and more problems due to the shortage of the initial design.

SUMMARY

Embodiments of the present disclosure propose a method for processing a service using a request, an electronic device, and a computer readable storage medium.

In a first aspect, some embodiments of the present disclosure provide a method for processing a service using requests, the method includes: acquiring a service using a request for a vehicle-mounted device; determining a to-be-processed request from an unprocessed service using requests; determining, using a preset navigation status service layer, a service type to which the to-be-processed request belongs; and calling, using the navigation status service layer, a service module corresponding to the service type to process the to-be-processed request, the navigation status service layer recording corresponding relationships between different service types and different service modules.

In a second aspect, some embodiments of the present disclosure provide an electronic device, the electronic device includes: at least one processor; and a storage device, in communication with the at least one processor, where the storage device stores instructions executable by the at least one processor, and the instructions are executed by the at least one processor, to enable the at least one processor to perform the method for processing a service using request according to implementations of the first aspect.

In a third aspect, some embodiments of the present disclosure provide a non-transitory computer readable storage medium, storing computer instructions, where the computer instruction are used to cause a computer to perform the method for processing a service using request according to implementations of the first aspect.

The method for processing a service using request provided in embodiments of the present disclosure comprises: acquiring a service using a request for a vehicle-mounted device; determining a to-be-processed request from an unprocessed service using requests; determining, using a preset navigation status service layer, a service type to which the to-be-processed request belongs; and calling, using the navigation status service layer, a service module corresponding to the service type to process the to-be-processed request, the navigation status service layer recording corresponding relationships between different service types and different service modules.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

After reading detailed descriptions for non-limiting embodiments given with reference to the following accompanying drawings, other features, objectives and advantages of the present disclosure will be more apparent.

FIG. 1 is an example system architecture in which the present disclosure may be applied;

FIG. 2 is a flowchart of a method for processing a service using request provided by an embodiment of the present disclosure;

FIG. 6 is a flowchart of a method for updating a firmware of a navigation status service layer provided by an embodiment of the present disclosure;

FIG. 7 is a structural diagram of an apparatus for processing a service using request provided by an embodiment of the present disclosure; and FIG. 8 is a schematic structural diagram of an electronic device adapted to perform the method for processing a service using request, provided by an embodiment of the present disclosure.

DETAILED DESCRIPTION OF EMBODIMENTS

Figure 3:
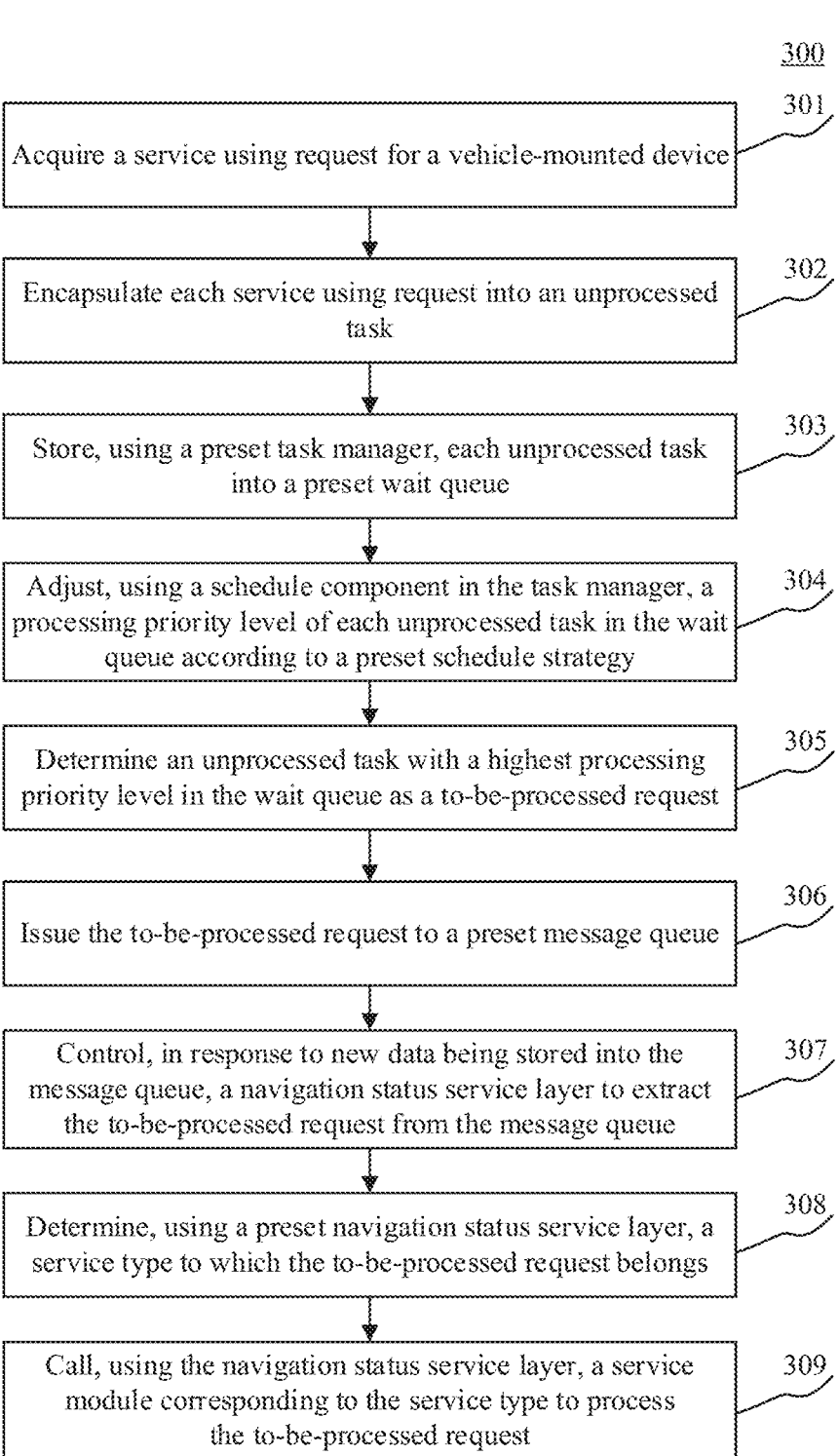
FIG. 3 is a flowchart of another method for processing a service using request provided by an embodiment of the present disclosure.

Example embodiments of the present disclosure are described below in combination with the accompanying drawings, and various details of embodiments of the present disclosure are included in the description to facilitate understanding, and should be considered as exemplary only. Accordingly, it should be recognized by one of ordinary skill in the art that various changes and modifications may be made to the embodiments described herein without departing from the scope of the present disclosure. Also, for clarity and conciseness, descriptions for well-known functions and structures are omitted in the following description. It should be noted that embodiments in the present disclosure and the features in the embodiments may be combined with each other on a non-conflict basis.

In the technical solution of the present disclosure, the collection, storage, use, processing, transmission, provision, disclosure, etc. of the personal information of a user all comply with the provisions of the relevant laws and regulations, and do not violate public order and good customs.

FIG. 1 illustrates an example system architecture in which a method and apparatus for processing a service using request, an electronic device and a computer readable storage medium according to an embodiment of the present disclosure may be applied.

As shown in FIG. 1, the system architecture 100 may include a vehicle-mounted terminal 101 (also referred to as a vehicle-mounted master control, or a vehicle-mounted device) and an in-vehicle occupant (not shown) or another functional component that issues an instruction to the vehicle-mounted terminal 101.

The in-vehicle occupant may interact with the vehicle-mounted terminal 101 by directly touching and/or clicking the touch screen of the vehicle-mounted terminal to 101, for example, view a returned message and/or issue a certain service using request. The in-vehicle occupant may alternatively indirectly interact with the vehicle-mounted terminal 101 by manipulating another electronic device. The another electronic device may refer to a smartphone, a tablet computer, a laptop portable computer, a desktop computer, and the like, and the another electronic device may perform a data interaction with the vehicle-mounted terminal by various means such as by a wired or wireless means.

Various applications may be installed on the vehicle-mounted terminal 101 to meet various service requirements of the in-vehicle occupant, for example, a single-function application such as a navigation application, a vehicle condition check application, and a vehicle speed control application, and a comprehensive application that integrates the above various single-function applications.

Taking a comprehensive application that may provide good processing for the service using request issued by the in-vehicle occupant as an example, the vehicle-mounted terminal 101 can achieve the following effects when running the comprehensive application. First, a service using request issued by an in-vehicle passenger is acquired through a click signal collected from the touch screen component. Then, a to-be-processed request is determined from unprocessed service using requests. Next, a service type to which the to-be-processed request belongs is determined using a preset navigation status service layer. Finally, a service module corresponding to the service type is called using the navigation status service layer, to process the to-be-processed request. That is, the navigation status service layer in the processing framework of the comprehensive application pre-records corresponding relationships between different service types and different service modules, such that after the service type to which the to-be-processed request belongs is determined, the navigation status service layer may correctly call the corresponding service module(s) at a bottom layer according to the corresponding relationships to process the to-be-processed request correctly.

Further referring to FIG. 2, FIG. 2 is a flowchart of a method for processing a service using request provided by an embodiment of the present disclosure. Here, the flow 200 includes the following steps:

Step 201, acquiring a service using request for a vehicle-mounted device.

This step is intended to acquire, by an executing body (e.g., the vehicle-mounted terminal 101 shown in FIG. 1) of the method for processing a service using request, a service using request issued to the above executing body by a direct means or an indirect means by an in-vehicle passenger. For example, it is possible to perceive, through a touch screen serving as an input device, the click information of the in-vehicle passenger on the touch screen, or it is possible to receive a control signal forwarded by another electronic device controlled by a user.

Here, the service using request is used to express the notification or instruction of the in-vehicle passenger for using a function or service in the various functions or services provided by the above executing body. Therefore, the service using request necessarily contains parameters for the above executing body to determine what the specific service is. For example, a certain field in the head information of the service using request records a serial number, a specific character string, a feature value, etc. that indicate which service is to be used.

Step 202, determining a to-be-processed request from unprocessed service using requests.

On the basis of step 201, this step is intended to determine, by the above executing body, the to-be-processed request from all of the unprocessed service using requests. That is, this step mainly describes how to better and more accurately determine, in the situation where there may be a plurality of unprocessed services using requests at the same time, a to-be-processed request that is about to be processed.

Particularly, when the parallel processing capability of the above executing body is insufficient, the determined to-be-processed request may include only one unprocessed service using a request or a few of the plurality of unprocessed service using requests. When the above executing body has a relatively strong parallel processing capability, the determined to-be-processed request may include a plurality of unprocessed service using requests or even all of the unprocessed service using requests.

In addition, the performance of the current vehicle-mounted terminal is usually not high, and the vehicle-mounted terminal does not have a strong parallel processing capability. Therefore, in this case, how to reasonably determine a to-be-processed request from a plurality of unprocessed service using requests in combination with a requirement of an actual application scenario is the focus of this step, which is further described in the subsequent embodiment.

Step 203, determining, using a preset navigation status service layer, a service type to which the to-be-processed request belongs.

Step 204, calling, using the navigation status service layer, a service module corresponding to the service type to process the to-be-processed request.

It should be noted that the navigation status service layer described in steps 203-204 is an additionally provided function layer, which is the difference from that described in embodiments of the present disclosure from the data processing framework of vehicle-mounted device provided in the prior art. The navigation status service layer is used to determine the actual service type to which the to-be-processed request belongs according to the information contained in the to-be-processed request and related to the service type, and is used to call, according to the preset corresponding relationships between different service types and different service modules, a service module for the to-be-processed request of which the actual service type is already determined, to particularly process the to-be-processed request.

That is, the navigation status service layer is established between a request transmission layer and a service module layer at the bottom layer, and is used to decouple the strong coupling between the service using a request and the service module.

In order to better meet the increasing requirements of the user for the functions of the vehicle-mounted device, in the method for processing a service using a request provided in embodiments of the present disclosure, the processing framework for the service using a request for the vehicle-mounted device is redesigned, the navigation status service layer is newly added between the transmission layer transmitting the to-be-processed request and the specific service modules at the bottom layer, and the corresponding relationships between different service types and different service modules are recorded in the navigation status service layer, such that the navigation status service layer can call the service module(s) corresponding to the actual service type to process the to-be-processed request, which implements the logic decoupling between the transmission layer and the service module(s), thus making new functions expanded and added more easily and reducing the maintenance complexity.

Further referring to FIG. 3, FIG. 3 is a flowchart of another method for processing a service using a request provided by an embodiment of the present disclosure. Here, the flow 300 includes the following steps:

Step 301, acquiring a service using a request for a vehicle-mounted device.

Step 302, encapsulating each service using a request into an unprocessed task.

This step is intended to encapsulate, by the above executing body, each service using a request into an independent unprocessed task, to facilitate a subsequent task manager to manage each unprocessed task.

Step 303, storing, using a preset task manager, each unprocessed task into a preset wait queue.

Step 304, adjusting, using a schedule component in the task manager, a processing priority level of each unprocessed task in the wait queue according to a preset schedule strategy.

Step 305, determining an unprocessed task with a highest processing priority level in the wait queue as a to-be-processed request.

Steps 303-304 are to store first, by the task manager in the above executing body, each unprocessed task into the wait queue for temporary storage, and then adjust, through the schedule component in the task manager and according to the schedule strategy in the task manager, the processing priority level of each unprocessed task in the wait queue, so as to determine the unprocessed task with the highest processing priority level in the wait queue as the to-be-processed request in step 305.

Particularly, there may be many kinds of schedule strategies, for example, a first-in first-out strategy in which sorting is performed according to time, a strategy in which sorting is performed according to the service urgency, and a load strategy in which sorting is performed according to the processing difficulty or consumed time, of which the purposes are to determine the most appropriate unprocessed task as the to-be-processed request under the corresponding scenario requirement.

Step 306, issuing the to-be-processed request to a preset message queue.

Step 307, controlling, in response to new data being stored into the message queue, a navigation status service layer to extract the to-be-processed request from the message queue.

Steps 306-307 in this embodiment reflects that a message queue for transferring a to-be-processed request is further provided between the task manager and the navigation status service layer. That is, the task manager issues the determined to-be-processed request to the message queue, and then, after perceiving that new data is stored into the message queue, the navigation status service layer extracts the to-be-processed request from the message queue for subsequent processing.

In addition, after being pre-set, the message queue may actively issue the to-be-processed request stored in the message queue to the corresponding navigation status service layer.

Step 308, determining, using a preset navigation status service layer, a service type to which the to-be-processed request belongs.

Step 309, calling, using the navigation status service layer, a service module corresponding to the service type to process the to-be-processed request.

Step 301 is consistent with step 201 shown in FIG. 2, and steps 308-309 are consistent with steps 203-204 shown in FIG. 2. For the content of the same part, reference is made to the corresponding part of the previous embodiment, and thus, the details will not be repeatedly described here.

On the basis of the embodiment shown in FIG. 2, this embodiment provides a specific subordinate implementation of step 202 through steps 302-305. By means of the newly added task manager (including the schedule component, the wait queue, and the schedule strategy), a plurality of service using requests can be managed and scheduled more flexibly. At the same time, the message queue for transferring the request is additionally provided between the task manager and the navigation status service layer through steps 306-307, to further decouple the logic coupling between the task manager and the navigation status service layer, and the responsibility of the functional component of each part is clarified, which is conducive to the restoration, adjustment and update with pertinence, thereby further reducing the complexity of operation and maintenance.

It should be noted that the scheme of the message queue provided in steps 306-307 is not necessarily dependent on the subordinate scheme provided in steps 302-305, or may absolutely form another new embodiment separately in combination with the flow 200. This embodiment exists only as a preferred embodiment including two preferred implementations at the same time.

Further, it is taken into consideration that when an in-vehicle occupant issues a service using a request to the above executing body (vehicle-mounted terminal), there may be a problem that the in-vehicle occupant repeatedly issues the same service using a request, due to an error touch or continuous triggering. Therefore, before the schedule component in the task manager is used to adjust the processing priority level of each unprocessed task in the wait queue according to the preset schedule strategy, it may determine the timestamp and task content of each unprocessed task in the wait queue, and then de-duplicating processing may be performed on the unprocessed tasks according to the timestamp and the task content. That is, the tasks of which the timestamps are close and of which the task contents are highly consistent or fully consistent should be determined as duplicate tasks. Clearly, the determination for the duplicate tasks may alternatively be implemented according to other parameters (e.g., the sources of the tasks), or the duplicate tasks may alternatively be determined by determining whether the continuous tasks have different meanings, so that by screening out a duplicate task invalid operation is finally avoided.

It is taken into consideration that the schedule component executed according to the preset schedule strategy may adjust the processing order of the each service using a request, resulting in the difference between the actual request time and the actual execution time of each to-be-processed service using a request, and with the change of the time difference the vehicle where the vehicle-mounted device is located may no longer be completely suitable for the to-be-processed request issued previously, for example, the speed adjustment instruction set previously and the start point in the navigation instruction also need to be re-calculated, and the parameter collected by a vehicle sensor also needs to be updated. Therefore, after the to-be-processed request is issued to a service module for specific execution, the service module may further determine whether there is a need for a compensation or adjustment for the operation to be executed, to be more in line with the actual situation.

An implementation, included but not limited, may refer to:

determining, using the navigation status service layer, a target service module corresponding to the service type;

issuing the to-be-processed request to the target service module;

controlling the target service module to determine a time difference between actual request time of the to-be-processed request and actual execution time of the to-be-processed request; and controlling the target service module to perform a compensation on an execution parameter of the to-be-processed request according to the time difference.

For example, if the actual request time of the to-be-processed request is T0 and the actual execution time of the to-be-processed request is T1, then the time difference is T1−T0. Correspondingly, the compensation for the execution parameter should correspond to the size of the time difference. That is, the time differences of different sizes may correspond to the same compensation approach or different compensation approaches. Even when the time difference is too large, the adjustment cannot be performed by the compensation, and it may only be required to re-input the same service using a request and temporarily add a high processing priority level flag to the same service using a request, so as to avoid the recurrence of the problem that the time difference is too large.

In addition, the step of calculating the time difference and the step of determining the compensation for the execution parameter may alternatively performed by an other functional module, so as to avoid the problem that the service module to which the request is issued needs to be adjusted due to the compensation.

In the perspective of how the vehicle-mounted terminal with a built-in new request processing framework processes the service using a request, the above embodiment describes the improvement of the new request processing framework over the existing processing framework. In order to present the new request processing framework more intuitively, this embodiment further directly provides, through FIG. 4, a schematic structural diagram of a framework for processing a service using a request for a vehicle-mounted device:

The framework includes: an application layer (SDK, Software Development Kit) for presenting an interface to the outside and being conducive to that an in-vehicle occupant issues a service using a request, a service layer, and a service module pool. Here, the service layer includes: a task manager, a message queue, and a navigation status service layer.

The request processing framework shown in this embodiment adopts a hierarchical idea and a modular design scheme. First, a task is created for each request event to perform tracking, and an overall external interface performs uniform scheduling processing by constructing a task manager.

An abstract navigation status service layer is constructed between the task manager and the service module pool, thus decoupling the control logic layer from the sub-module service, reducing the complexity, enhancing the expandability of navigation construction, and improving the overall maintainability.

Figure 5:
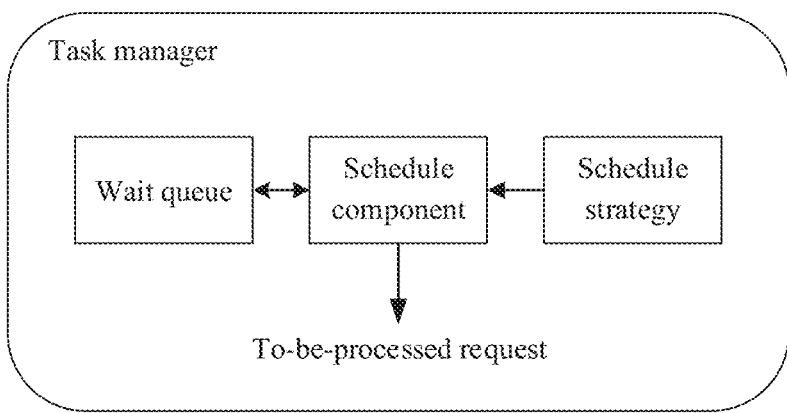
FIG. 5 is a schematic structural diagram of a task manager provided by an embodiment of the present disclosure.

The scheme architecture design of the task manager is mainly composed of a schedule component, a schedule strategy and a wait queue (for the structure, reference may be made to FIG. 5). A received new service using a request is stored into the wait queue for temporary storage, to wait for scheduling. The schedule component may be specifically controlled by a timer, and run periodically after being created. When a new task is found in a task priority queue, the schedule component will actively acquire and execute the task (e.g., the frequency of the active acquisition may be set to one second, which may be customized). Particularly, the principle of acquiring a task is determined by the preset schedule strategy.

In addition to the common first-in first-out strategy, an urgent service goes first schedule strategy is described here.

In response to determining that the schedule strategy includes the urgent service goes first schedule strategy, the task manager may be used to respectively determine a service urgency of the each unprocessed task in the wait queue. Then, the unprocessed tasks in the wait queue are re-sorted according to sizes of the service urgencies, to make an unprocessed task with a higher service urgency have a higher processing priority level.

The scheme architecture design of the navigation status service layer may adopt a simple factory mode, that is, may be composed of a management class and several specific service classes. The management class is mainly a template class that is responsible for processing the navigation status service flow, and a specific service class is implemented inside a specific service module.

Figure 4:
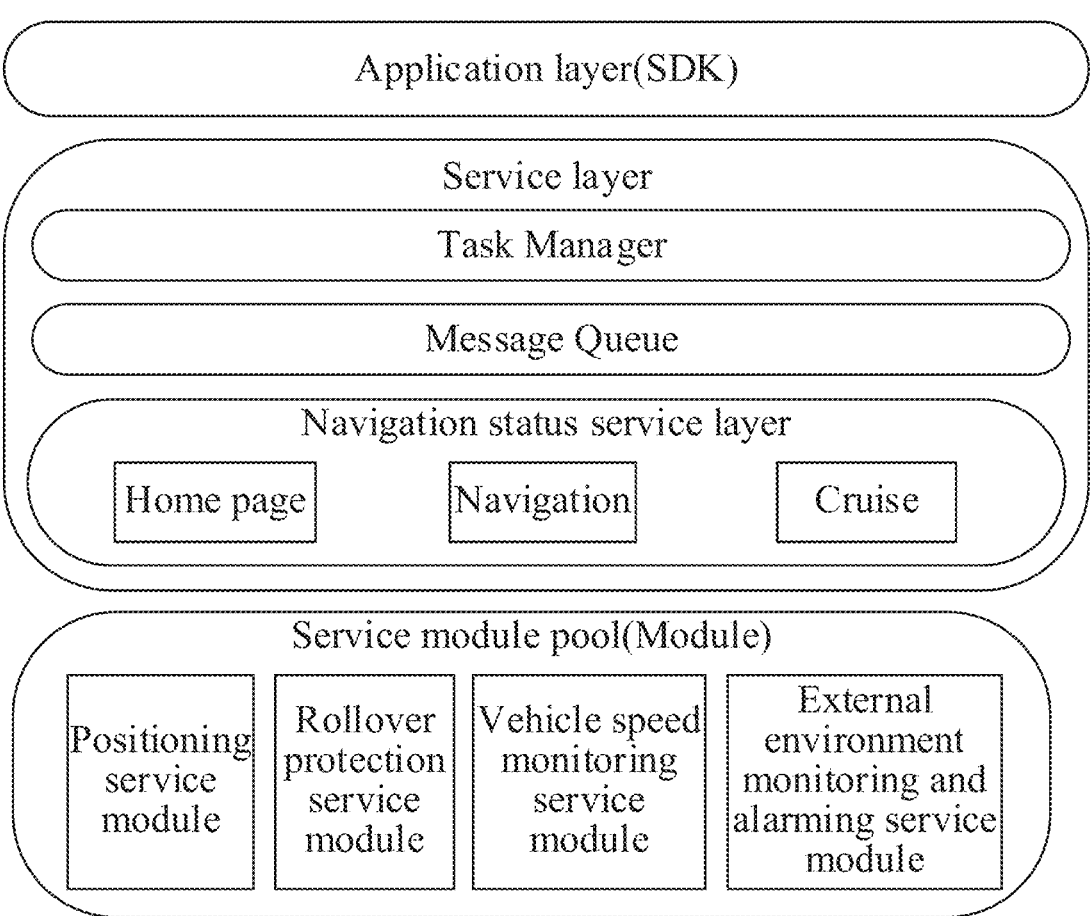
FIG. 4 is a schematic structural diagram of a framework for processing a service using request of a vehicle-mounted device, provided by an embodiment of the present disclosure.

The request processing framework shown in FIG. 4 is capable of supporting more service requirements of the vehicle-mounted terminal, which is conducive to the long-term service development, reducing the complexity of the overall system, reducing the degree of coupling between services, and enhancing the stability, expandability and maintainability of the overall system.

To show the beneficial effect of reducing the complexity of operation and maintenance that is brought by the solution provided in embodiments of the present disclosure, this embodiment further describes how to implement the addition of a new service, through the flowchart of a method for updating the firmware of the navigation status service layer that is shown in FIG. 6.

Step 601, in response to receiving a new service type update instruction, receiving a new firmware of the navigation status service layer corresponding to the new service type update instruction.

Here, the new firmware records a corresponding relationship between a new service type and a service module.

Clearly, in addition to an update instruction dedicated to indicating that a new service type is added in addition to an original service type, an update instruction for adjusting the original service type may be included.

Step 602, in response to determining that the navigation status service layer is currently in an updatable status, relacing the original firmware with the new firmware to obtain an updated navigation status service layer.

On the basis of step 301, this step is intended to implement, by the above executing body, the update of the navigation status service layer by replacing the firmware in the situation where the navigation status service layer is in the updatable state. That is, the addition of the new service type is implemented quickly and efficiently, without steps such as a complex logic rewriting step.

For a deeper understanding, a detailed implementation of the present disclosure in combination with a detailed application scenario is provided:

1) A vehicle-mounted terminal receives a constant-speed cruise service using a request issued by a driver by clicking a touch screen.

2) The vehicle-mounted terminal determines, through a schedule component in a task manager, the constant-speed cruise service using a request as a to-be-processed request to be processed next, based on a schedule strategy of a preset service type.

3) The vehicle-mounted terminal determines that the service type of the to-be-processed request is constant-speed cruise, by using the navigation status service layer.

4) The vehicle-mounted terminal calls a navigation service module corresponding to the constant-speed cruise, a vehicle speed monitoring service module corresponding to the constant-speed cruise, and an external environment monitoring and alarming service module corresponding to the constant-speed cruise, by using the navigation status service layer, to process the to-be-processed a request.

Here, the navigation service module is used to indicate a navigation route, the vehicle speed monitoring service module is used to maintain a fixed vehicle speed, and the external environment monitoring and alarming service module is used to monitor an external traveling environment to ensure the traveling safety during the constant-speed cruise.

5) The vehicle-mounted terminal summarizes a request execution result returned by the navigation service module, the vehicle speed monitoring service module, and the external environment monitoring and alarming service module, and then presents the result to the driver.

Further referring to FIG. 7, as an implementation of the method shown in the above drawings, an embodiment of the present disclosure provides an apparatus for processing a service using a request. The embodiment of the apparatus corresponds to the embodiment of the method shown in FIG. 2, and the apparatus may be applied in various electronic devices.

As shown in FIG. 7, the apparatus 700 for processing a service using a request in this embodiment may include: a service using a request acquiring unit 701, a to-be-processed a request determining unit 702, a service type determining unit 703, and a service module calling and processing unit 704. Here, the service using a request acquiring unit 701 is configured to acquire a service using a request for a vehicle-mounted device. The to-be-processed a request determining unit 702, configured to determine a to-be-processed a request from unprocessed service using a requests. The service type determining unit 703 is configured to determine, using a preset navigation status service layer, a service type to which the to-be-processed a request belongs. The service module calling and processing unit 704 is configured to call, using the navigation status service layer, a service module corresponding to the service type to process the to-be-processed a request, the navigation status service layer recording corresponding relationships between different service types and different service modules.

In this embodiment, for specific processes of the service using a request acquiring unit 701, the to-be-processed a request determining unit 702, the service type determining unit 703 and the service module calling and processing unit 704 in the apparatus 700 for processing a service using a request, and their technical effects, reference may be respectively made to relative descriptions of steps 201-204 in the corresponding embodiment of FIG. 2, and thus the details will not be repeatedly described here.

In some alternative implementations of this embodiment, the to-be-processed request determining unit 702 may include:

a request encapsulating subunit, configured to encapsulate each service using a request into an unprocessed task;

a task temporary storage subunit, configured to store, using a preset task manager, each unprocessed task into a preset wait queue;

a processing priority level adjusting subunit, configured to adjust, using a schedule component in the task manager, a processing priority level of the each unprocessed task in the wait queue according to a preset schedule strategy; and a to-be-processed request determining subunit, configured to determine an unprocessed task with a highest processing priority level in the wait queue as the to-be-processed a request.

In some alternative implementations of this embodiment, the to-be-processed request determining unit may further include:

a timestamp and task content determining subunit, configured to determine a timestamp and task content of the each unprocessed task in the wait queue, before the processing priority level of the each unprocessed task in the wait queue is adjusted using the schedule component in the task manager according to the preset schedule strategy; and a de-duplicating subunit, configured to perform de-duplicating processing on unprocessed tasks according to the timestamp and the task content of the each unprocessed task in the wait queue.

In some alternative implementations of this embodiment, the processing priority level adjusting subunit may be further configured to:

in response to determining that the schedule strategy comprises an urgent service goes first schedule strategy, determine respectively, using the task manager, a service urgency of the each unprocessed task in the wait queue; and re-sort the each unprocessed task in the wait queue according to a size of the service urgency, to make an unprocessed task with a higher service urgency have a higher processing priority level.

In some alternative implementations of this embodiment, the apparatus 700 for processing a service using a request may further include:

a to-be-processed a request issuing unit, configured to issue the to-be-processed request to a preset message queue, before the service type to which the to-be-processed request belongs is determined using the preset navigation status service layer; and a control reading unit, configured to control, in response to new data being stored into the message queue, the navigation status service layer to extract the to-be-processed request from the message queue.

In some alternative implementations of this embodiment, the apparatus 700 for processing a service using a request may further include:

a new firmware receiving unit, configured to receive, in response to receiving a new service type update instruction, receiving a new firmware of the navigation status service layer corresponding to the new service type update instruction, the new firmware recording a corresponding relationship between a new service type and a service module; and a firmware updating unit, configured to replace, in response to determining that the navigation status service layer currently is in an updatable status, an original firmware with the new firmware to obtain an updated navigation status service layer.

In some alternative implementations of this embodiment, the service module calling and processing unit 704 may be further configured to:

determine, using the navigation status service layer, a target service module corresponding to the service type;

issue the to-be-processed request to the target service module;

control the target service module to determine a time difference between actual request time and actual execution time of the to-be-processed request; and control the target service module to compensate an execution parameter of the to-be-processed request according to the time difference.

In some alternative implementations of this embodiment, the service type determining unit 703 may be further configured to:

determine, using the navigation status service layer, that the service type of the to-be-processed request is constant-speed cruise.

Correspondingly, the service module calling and processing unit 704 may be further configured to:

call, using the navigation status service layer, a navigation service module corresponding to the constant-speed cruise, a vehicle speed monitoring service module corresponding to the constant-speed cruise, and an external environment monitoring and alarming service module corresponding to the constant-speed cruise, to process the to-be-processed request, wherein the navigation service module is used for indicating a navigation route, the vehicle speed monitoring service module is used for maintaining a fixed vehicle speed, and the external environment monitoring and alarming service module is used for monitoring an external traveling environment to ensure traveling safety during the constant-speed cruise.

This embodiment exists as an embodiment of the apparatus corresponding to the embodiment of the above method.

In order to better meet the increasing requirements of the user for the functions of the vehicle-mounted device, according to the apparatus for processing a service using a request provided in embodiments of the present disclosure, the processing framework for the service using a request for the vehicle-mounted device is redesigned, the navigation status service layer is newly added between the transmission layer transmitting the to-be-processed request and the specific service module at the bottom layer, and the corresponding relationships between different service types and different service modules are recorded in the navigation status service layer, such that the navigation status service layer is capable of calling the service module corresponding to the actual service type to process the to-be-processed a request, which implements the logic decoupling between the transmission layer and the service module, thus making new functions expanded and added more easily and reducing the maintenance complexity.

An embodiment of the present disclosure further provides an electronic device including at least one processor, and a storage device in communication with the at least one processor. Here, the storage device stores instructions executable by the at least one processor, and the instructions are executed by the at least one processor, to enable the at least one processor to perform the method for processing a service using a request described in any of the above embodiments.

An embodiment of the present disclosure further provides a readable storage medium, storing computer instructions. The computer instructions, when executed, are used to enable a computer to perform the method for processing a service using a request described in any of the above embodiments.

An embodiment of the present disclosure provides a computer program product, comprising a computer program, wherein the computer program, when executed by a processor, causes the processor to implement the method for processing a service using a request described in any of the above embodiments.

FIG. 8 is a schematic block diagram of an example electronic device 800 that may be used to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only—examples, and not intended to limit implementations of the present disclosure as described and/or claimed herein.

As shown in FIG. 8, the device 800 includes a computing unit 801 that can perform various appropriate actions and processes according to a computer program stored in a read only memory (ROM) 802 or a computer program loaded from the storage unit 808 into a random access memory (RAM) 803. In RAM 803, various programs and data required for the operation of device 800 may also be stored. The computing unit 801, Rom 802 and RAM 803 are connected to each other through bus 804. The input/output (I/O) interface 805 is also connected to the bus 804.

A plurality of components in the device 800 are connected to the I/O interface 805, including: an input unit 806, such as a keyboard, a mouse and the like; an output unit 807, such as various types of displays, speakers, and the like; a storage unit 808, such as a magnetic disk, an optical disc, and the like; and a communication unit 809, such as a network card, a modem, a wireless communication transceiver and the like. The communication unit 809 allows the device 800 to exchange information/data with other devices through computer networks such as the Internet and/or various telecommunication networks.

The computing unit 801 may be various general and/or dedicated processing components with processing and computing capabilities. Some examples of the computing unit 801 include, but are not limited to, a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 801 performs various methods and processes described above, such as a method for processing a service using a request. For example, in some embodiments, a method for enhancing an image contrast may be implemented as a computer software program tangibly contained in a machine-readable medium, such as a storage unit 808. In some embodiments, part or all of the computer program may be loaded and/or installed on the device 800 via ROM 802 and/or communication unit 809. When the computer program is loaded into the RAM 803 and executed by the computing unit 801, one or more steps of the method for enhancing an image contrast described above may be performed. Alternatively, in other embodiments, the computing unit 801 may be configured to perform a method for enhancing an image contrast by any other suitable means (E. G., by means of firmware).

Various embodiments of the systems and technologies described above herein may be implemented in digital electronic circuit systems, integrated circuit systems, field programmable gate arrays (FPGAs), application specific integrated circuits (ASICs), application specific standard products (ASSPS), system on chip (SOC), load programmable logic devices (CPLDs), computer hardware, firmware, software, and/or combinations thereof. These various embodiments may include being implemented in one or more computer programs that may be executed and/or interpreted on a programmable system including at least one programmable processor, which may be a dedicated or general programmable processor that may receive data and instructions from a storage system, at least one input device, and at least one output device, and transmit data and instructions to the storage system, the at least one input device, and the at least one output device.

The program code for implementing the methods of the present disclosure may be written in any combination of one or more programming languages. These program codes can be provided to the processor or controller of a general computer, dedicated computer or other programmable data processing device, so that when executed by the processor or controller, the program code enables the functions/operations specified in the flow chart and/or block diagram to be implemented. The program code can be executed completely on the machine, partially on the machine, partially on the machine and partially on the remote machine as a separate software package, or completely on the remote machine or server.

In the context of the present disclosure, a machine readable medium may be a tangible medium which may contain or store a program for use by, or used in combination with, an instruction execution system, apparatus or device. The machine readable medium may be a machine readable signal medium or a machine readable storage medium. The computer readable medium may include, but is not limited to, electronic, magnetic, optical, electromagnetic, infrared, or semiconductor systems, apparatuses, or devices, or any appropriate combination of the above. A more specific example of the machine readable storage medium will include an electrical connection based on one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or an LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or tactile feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other. The server can be a cloud server, also known as a cloud computing server or a virtual machine. It is a host product in the cloud computing service system to solve the problems of difficult management and weak business scalability in the traditional physical host and virtual private server (VPS) services.

In order to better meet the increasing requirements of a user for the functions of a vehicle-mounted device, in embodiments of the present disclosure, the processing framework for a service using a request for the vehicle-mounted device is redesigned, a navigation status service layer is newly added between a transmission layer transmitting a to-be-processed request and a specific service module at a bottom layer, and corresponding relationships between different service types and different service modules are recorded in the navigation status service layer, such that the navigation status service layer can call the service module corresponding to an actual service type to process the to-be-processed request, which implements the logic decoupling between the transmission layer and the service module, thus making new functions expanded and added more easily and reducing the maintenance complexity.

It should be understood that the various forms of processes shown above may be used to reorder, add, or delete steps. For example, the steps disclosed in embodiments of the present disclosure may be executed in parallel, sequentially, or in different orders, as long as the desired results of the technical solutions mentioned in embodiments of the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the principle of the present disclosure should be encompassed within the scope of protection of the present disclosure.

What is claimed is:

1. A method for processing service using requests, comprising:

determining a to-be-processed service using request from unprocessed service using requests for a vehicle-mounted device;

determining, using a preset navigation status service layer, a service type to which the to-be-processed service using request belongs;

determining, using the preset navigation status service layer, a target service module corresponding to the service type and for executing the to-be-processed service using request, wherein the preset navigation status service layer records corresponding relationships between service types including the service type and service modules including the target service module;

issuing the to-be-processed service using request to the target service module;

controlling the target service module to determine a time difference between an actual request time and an actual execution time of the to-be-processed service using request; and controlling the target service module to compensate an execution parameter of the to-be-processed service using request according to the time difference, wherein the method further comprises:

in response to the time difference satisfying a threshold, returning a prompt requesting re-input of the to-be-processed service using request and adding a flag to a re-input to-be-processed service using request, and controlling the preset navigation status service layer to issue the re-input to-be-processed service using request to the target service module with priority according to the flag.

2. The method according to claim 1, wherein the determining the to-be-processed service using request from the unprocessed service using requests comprises:

encapsulating each service using request into an unprocessed task;

storing, using a preset task manager, each unprocessed task into a preset wait queue;

adjusting, using a schedule component in the task manager, a processing priority level of the each unprocessed task in the wait queue according to a preset schedule strategy; and determining an unprocessed task with a highest processing priority level in the wait queue as the to-be-processed service using request.

3. The method according to claim 2, wherein before adjusting, using the schedule component in the task manager, the processing priority level of the each unprocessed task in the wait queue according to the preset schedule strategy, the method further comprises:

determining a timestamp and task content of the each unprocessed task in the wait queue; and performing de-duplicating processing on unprocessed tasks according to the timestamp and the task content of the each unprocessed task in the wait queue.

4. The method according to claim 2, wherein the adjusting, using the schedule component in the task manager, the processing priority level of the each unprocessed task in the wait queue according to the preset schedule strategy comprises:

in response to determining that the schedule strategy comprises an urgent service goes first schedule strategy, determining respectively, using the task manager, a service urgency of the each unprocessed task in the wait queue; and re-sorting the each unprocessed task in the wait queue according to a size of the service urgency, to make an unprocessed task with a higher service urgency have a higher processing priority level.

5. The method according to claim 1, wherein before determining, using the preset navigation status service layer, the service type to which the to-be-processed service using request belongs, the method further comprises:

issuing the to-be-processed service using request to a message queue; and controlling, in response to new data being stored into the message queue, the preset navigation status service layer to extract the to-be-processed service using request from the message queue.

6. The method according to claim 1, further comprising:

in response to receiving a new service type update instruction, receiving a new firmware of the preset navigation status service layer corresponding to the new service type update instruction, the new firmware recording a corresponding relationship between a new service type and a service module; and in response to determining that the preset navigation status service layer currently is in an updatable status, replacing an original firmware with the new firmware to obtain an updated navigation status service layer.

7. The method according to claim 1, wherein the to-be-processed service using request is a constant-speed cruise service using request, and the target service module corresponding to the service type to which the to-be-processed service using request belongs comprises a navigation service module used to indicate a navigation route, a vehicle speed monitoring service module used to maintain a fixed vehicle speed, and an external environment monitoring and alarming service module used to monitor an external traveling environment.

8. The method according to claim 1, wherein the determining, using the preset navigation status service layer, the service type to which the to-be-processed service using request belongs comprises:

determining, using the preset navigation status service layer, that the service type of the to-be-processed service using request is constant-speed cruise, and the calling, using the preset navigation status service layer, the service module corresponding to the service type to process the to-be-processed service using request correspondingly comprises:

calling, using the preset navigation status service layer, a navigation service module corresponding to the constant-speed cruise, a vehicle speed monitoring service module corresponding to the constant-speed cruise, and an external environment monitoring and alarming service module corresponding to the constant-speed cruise, to process the to-be-processed service using request, wherein the navigation service module is used for indicating a navigation route, the vehicle speed monitoring service module is used for maintaining a fixed vehicle speed, and the external environment monitoring and alarming service module is used for monitoring an external traveling environment to ensure traveling safety during the constant-speed cruise.

9. An electronic device, comprising:

at least one processor; and a storage device, in communication with the at least one processor, wherein the storage device stores instructions executable by the at least one processor, and the instructions when executed by the at least one processor, cause the at least one processor to perform operations, the operations comprising:

determining a to-be-processed service using request from unprocessed service using requests for a vehicle-mounted device;

determining, using a preset navigation status service layer, a service type to which the to-be-processed service using request belongs;

determining, using the preset navigation status service layer, a target service module corresponding to the service type and for executing the to-be-processed service using request, wherein the preset navigation status service layer records corresponding relationships between service types including the service type and service modules including the target service module;

issuing the to-be-processed service using request to the target service module;

controlling the target service module to determine a time difference between an actual request time and an actual execution time of the to-be-processed service using request; and controlling the target service module to compensate an execution parameter of the to-be-processed service using request according to the time difference, wherein the operations further comprise:

in response to the time difference satisfying a threshold, returning a prompt requesting re-input of the to-be-processed service using request and adding a flag to a re-input to-be-processed service using request, and controlling the preset navigation status service layer to issue the re-input to-be-processed service using request to the target service module with priority according to the flag.

10. The electronic device according to claim 9, wherein the determining the to-be-processed service using request from the unprocessed service using requests comprises:

encapsulating each service using request into an unprocessed task;

storing, using a preset task manager, each unprocessed task into a preset wait queue;

adjusting, using a schedule component in the task manager, a processing priority level of the each unprocessed task in the wait queue according to a preset schedule strategy; and determining an unprocessed task with a highest processing priority level in the wait queue as the to-be-processed service using request.

11. The electronic device according to claim 10, wherein before adjusting, using the schedule component in the task manager, the processing priority level of the each unprocessed task in the wait queue according to the preset schedule strategy, the operations further comprising:

determining a timestamp and task content of the each unprocessed task in the wait queue; and performing de-duplicating processing on unprocessed tasks according to the timestamp and the task content of the each unprocessed task in the wait queue.

12. The electronic device according to claim 10, wherein the adjusting, using the schedule component in the task manager, the processing priority level of the each unprocessed task in the wait queue according to the preset schedule strategy comprises:

in response to determining that the schedule strategy comprises an urgent service goes first schedule strategy, determining respectively, using the task manager, a service urgency of the each unprocessed task in the wait queue; and re-sorting the each unprocessed task in the wait queue according to a size of the service urgency, to make an unprocessed task with a higher service urgency have a higher processing priority level.

13. The electronic device according to claim 9, wherein before determining, using the preset navigation status service layer, the service type to which the to-be-processed service using request belongs, the operations further comprising:

issuing the to-be-processed service using request to a preset message queue; and controlling, in response to new data being stored into the message queue, the preset navigation status service layer to extract the to-be-processed service using request from the message queue.

14. The electronic device according to claim 9, wherein the operations further comprise:

in response to receiving a new service type update instruction, receiving a new firmware of the preset navigation status service layer corresponding to the new service type update instruction, the new firmware recording a corresponding relationship between a new service type and a service module; and in response to determining that the preset navigation status service layer currently is in an updatable status, replacing an original firmware with the new firmware to obtain an updated navigation status service layer.

15. The electronic device according to claim 9, wherein the to-be processed service using request is a constant-speed cruise service using request, and the target service module corresponding to the service type to which the to-be-processed service using request belongs comprises a navigation service module used to indicate a navigation route, a vehicle speed monitoring service module used to maintain a fixed vehicle speed, and an external environment monitoring and alarming service module used to monitor an external traveling environment.

16. The electronic device according to claim 9, wherein the determining, using the preset navigation status service layer, the service type to which the to-be-processed request belongs comprises:

determining, using the preset navigation status service layer, that the service type of the to-be-processed service using request is constant-speed cruise, and the calling, using the preset navigation status service layer, the service module corresponding to the service type to process the to-be-processed service using request correspondingly comprises:

calling, using the preset navigation status service layer, a navigation service module corresponding to the constant-speed cruise, a vehicle speed monitoring service module corresponding to the constant-speed cruise, and an external environment monitoring and alarming service module corresponding to the constant-speed cruise, to process the to-be-processed service using request, wherein the navigation service module is used for indicating a navigation route, the vehicle speed monitoring service module is used for maintaining a fixed vehicle speed, and the external environment monitoring and alarming service module is used for monitoring an external traveling environment to ensure traveling safety during the constant-speed cruise.

17. A non-transitory computer readable storage medium, storing computer instructions, wherein the computer instructions are used to cause a computer to perform operations, the operations comprising:

determining a to-be-processed service using request from unprocessed service using requests for a vehicle-mounted device;

determining, using a preset navigation status service layer, a service type to which the to-be-processed service using request belongs;

determining, using the preset navigation status service layer, a target service module corresponding to the service type and for executing the to-be-processed service using request, wherein the preset navigation status service layer records corresponding relationships between service types including the service type and service modules including the target service module;

issuing the to-be-processed service using request to the target service module;

controlling the target service module to determine a time difference between an actual request time and an actual execution time of the to-be-processed service using request; and controlling the target service module to compensate an execution parameter of the to-be-processed service using request according to the time difference, wherein the operations further comprise:

in response to the time difference satisfying a threshold, returning a prompt requesting re-input of the to-be-processed service using request and adding a flag to a re-input to-be-processed service using request, and controlling the preset navigation status service layer to issue the re-input to-be-processed service using request to the target service module with priority according to the flag.

18. The non-transitory computer readable storage medium according to claim 17, wherein the determining the to-be-processed service using request from the unprocessed service using requests comprises:

encapsulating each service using request into an unprocessed task;

storing, using a preset task manager, each unprocessed task into a preset wait queue;

adjusting, using a schedule component in the task manager, a processing priority level of the each unprocessed task in the wait queue according to a preset schedule strategy; and determining an unprocessed task with a highest processing priority level in the wait queue as the to-be-processed service using request.

19. The non-transitory computer readable storage medium according to claim 18, wherein before adjusting, using the schedule component in the task manager, the processing priority level of the each unprocessed task in the wait queue according to the preset schedule strategy, the operations further comprising:

determining a timestamp and task content of the each unprocessed task in the wait queue; and performing de-duplicating processing on unprocessed tasks according to the timestamp and the task content of the each unprocessed task in the wait queue.

20. The non-transitory computer readable storage medium according to claim 19, wherein the adjusting, using the schedule component in the task manager, the processing priority level of the each unprocessed task in the wait queue according to the preset schedule strategy comprises:

in response to determining that the schedule strategy comprises an urgent service goes first schedule strategy, determining respectively, using the task manager, a service urgency of the each unprocessed task in the wait queue; and re-sorting the each unprocessed task in the wait queue according to a size of the service urgency, to make an unprocessed task with a higher service urgency have a higher processing priority level.

\* \* \* \* \*